INVENTOR
HOP LEE
BY William R. Piper
ATTORNEY

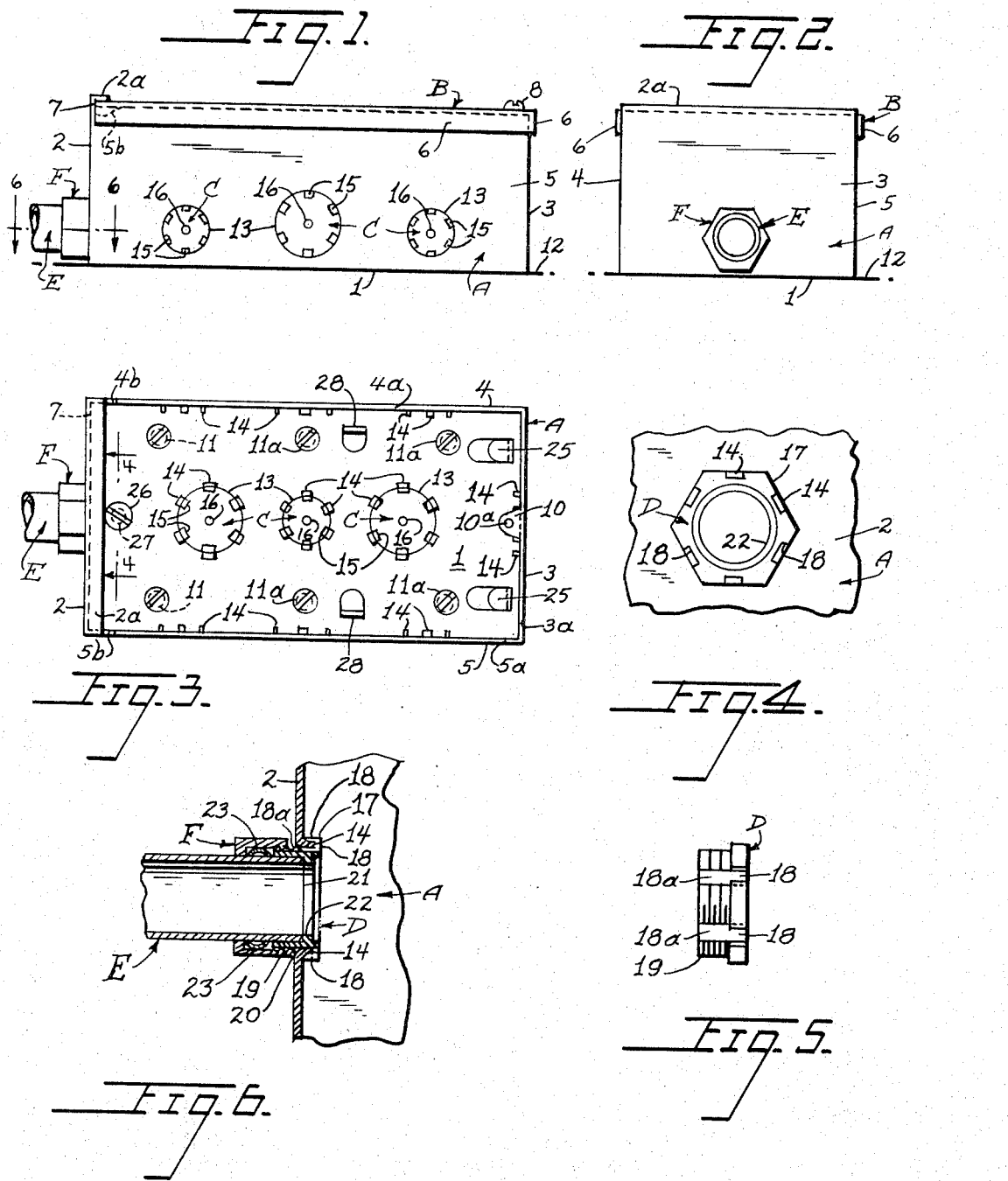

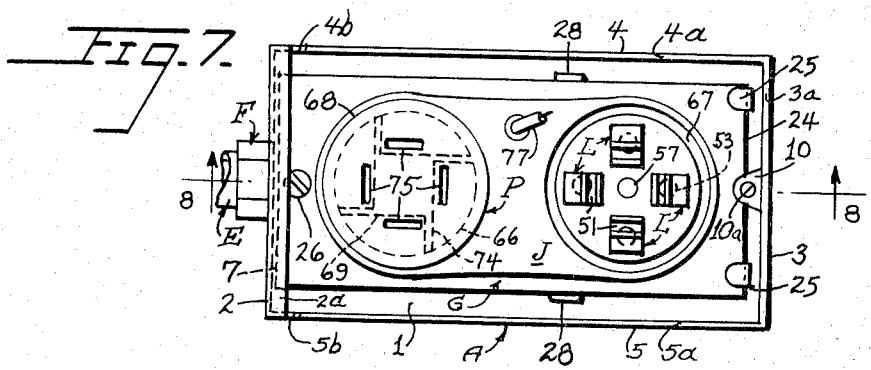
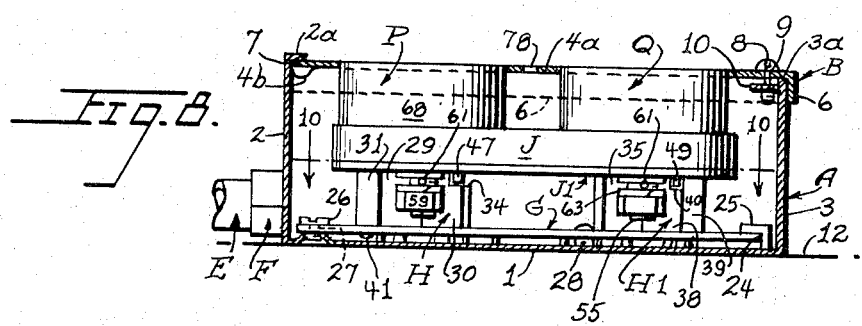
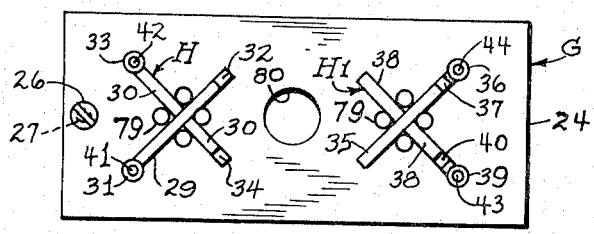

United States Patent Office 3,355,700
Patented Nov. 28, 1967

3,355,700
ELECTRIC SOCKETS MOUNTED IN AN OUTLET BOX
Hop Lee, 779 Commercial St., San Francisco, Calif. 94108
Filed Aug. 9, 1965, Ser. No. 478,040
4 Claims. (Cl. 339—119)

ABSTRACT OF THE DISCLOSURE

Electric sockets mounted in an outlet box and including a common insulating base with groups of upstanding terminals secured to the base, each socket containing one of the terminal groups. An insulating cap encloses each terminal group and has slots registering with the terminals. The base has bus bars for electrically interconnecting the terminals in one group with the associate terminals in the other group. The sockets and base can be mounted as a unit in an outlet box.

---

In the present invention I mount two of the electric sockets on a common base and I disclose novel means for mounting the socket base in the outlet box. A cover is removably secured to the outlet box and it has two openings that register with the insulating caps that enclose the electric terminals. The caps have slots registering with the socket terminals and electric plugs of the type disclosed in my patent have terminals that can be first registered with and then inserted through the slots for electrical connection with the socket terminals.

The electric outlet box is provided with one or more knock-out discs in the four walls and bottom of the box. Inwardly extending and spaced apart tongues are arranged around the periphery of each knock-out disc. An anchor sleeve has an exteriorly threaded cylindrical portion that extends through the box opening provided when the knock-out disc is removed. The anchor sleeve has a head provided with recesses designed to receive the spaced apart tongues so that the head cannot rotate with respect to the box. This arrangement prevents the cylindrical portion from rotating when a nut is threaded onto the cylindrical portion for securing an end of a pipe or flexible conduit to the box.

The various parts forming the electric sockets and the supporting means for the sockets within the box are designed so as to be assembled in only one particular way. Only a screw driver and a wrench are needed for assembling or dis-assembling the parts.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 1 is a side elevation of the electric outlet box with the box cover in closed position.

FIGURE 2 is an end elevation of FIGURE 1.

FIGURE 3 is a top plan view of FIGURE 1 with the box cover removed.

FIGURE 4 is a full size view of the head of an anchor sleeve used in connecting an electric pipe or conduit to the outlet box and is taken along the line 4—4 when looking in the direction of the arrows, in FIGURE 3.

FIGURE 5 is a side elevation of the anchor sleeve shown full size.

FIGURE 6 is a longitudinal section taken along the line 6—6 of FIGURE 1, and shows the anchor sleeve, gland nut, metal packing ring and electrical pipe or conduit, full size.

FIGURE 7 is a top plan view of the electric outlet box on the same scale as FIGURES 1, 2 and 3, and illustrates a pair of electric sockets mounted in the box. The box cover has been removed.

FIGURE 8 is a longitudinal section taken along the line 8—8 of FIGURE 7, and shows the pair of electric sockets in side elevation and secured to the bottom wall of the box.

FIGURE 9 is a top plan view of the main insulating base with the cross-shaped pair of legs for supporting the insulating socket base in spaced relation with respect to the main base.

Figure 10:
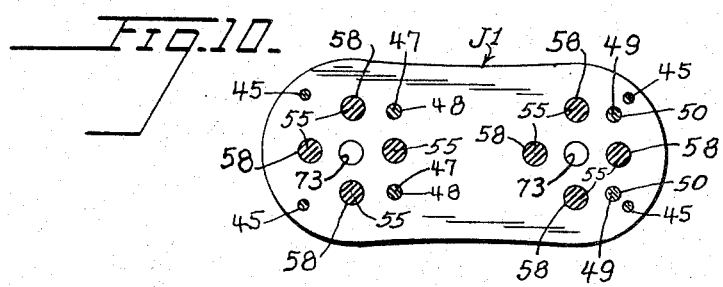
FIGURE 10 is a plan view of the insulating plate for concealing the bus bars mounted in the insulating socket base and is taken along the line 10—10 of FIGURE 8 when looking in the direction of the arrows.

While I have shown only the preferred form of my invention, it should be understood that various changes, or modifications, may be made within the scope of the annexed claims without departing from the spirit thereof.

Detailed description

In carrying out my invention, I provide an electric outlet box indicated generally at A, and preferably made of metal, see FIGURES 1 and 2. The box has a lower wall 1, two end walls 2 and 3, and two side walls 4 and 5. The end wall 2 has an inwardly extending flange 2a that is spaced above the upper side edges 4a and 5a, and above the upper end edge 3a. The upper side edges 4a and 5a have recesses 4b and 5b disposed adjacent to the end wall 2 and partially underlying the flange 2a.

A removable box cover B has a flange 6 that extends around two sides 4 and 5 and the end 3 of the box A, while the other end 7 is designed to be inserted under the flange 2a of the box A so as to be held in place by the flange, see FIGURES 1 and 7. The cover B is held in closed position by a single screw 8 that has a reduced diameter shaft portion received in an opening 9 in the cover, see FIGURE 8, and a threaded portion receivable in a threaded opening 10a provided in a lug 10 that extends inwardly from the box end wall 3.

FIGURE 3 shows the box bottom wall 1 provided with a plurality of openings 11 for receiving screws 11a by means of which the box may be secured to a supporting surface 12 such as a wall. The box bottom wall 1, end walls 2 and 3 and side walls 4 and 5 are provided with knock-out discs for providing openings for receiving pipe or conduit ends that carry the electric wires. The side and end box walls have knock-out discs C of various sizes and these are formed at different places in the walls. The discs initially are integral with the box walls and have circular score lines 13 provided in the box walls for weakening the connection between the disc periphery and the adjacent wall surface. A plurality of spaced apart tongues 14 are struck inwardly from the circular edge 13 of the disc and leave spaced apart recesses 15 in the knock-out disc. The discs C also have center holes 16 for receiving the pointed end of a tool, not shown, that is used for knocking out one or more of the discs.

In FIGURE 6, I show the end wall 2 of the box A and a center knock-out disc C has been removed from the end wall leaving an opening surrounded by the inwardly extending spaced apart tongues 14. An anchor sleeve is shown at D in FIGURES 4, 5 and 6 and it has a hexagonal head 17 shown full size in FIGURE 4. The head is provided with recesses 18 that are designed to receive the inwardly extending tongues 14, see FIGURE 6. The recesses 18 register with the grooves 18a, see FIGURE 5, and these longitudinally extending grooves are provided in the exteriorly threaded cylindrical portion 19 of the anchor sleeve D.

FIGURE 6 shows the threaded portion 19 extending through the opening 20 in the end wall 2 that is formed when the knock-out disc C is removed from the end wall. A pipe E or electric conduit has one end 21 received in the cylindrical portion 19 of the anchor sleeve D and this pipe end abuts an inwardly extending annular flange 22 that is provided in the anchor sleeve. A metal packing ring 23, see FIGURE 6, encloses the pipe or conduit E and is moved up against the outer end of the anchor sleeve D. A gland nut F is now mounted on the pipe or conduit E and has an internally threaded portion for receiving the exteriorly threaded portion 19 of the anchor sleeve. A tightening of the nut F will cause the gland nut 23 to frictionally engage with the pipe or conduit E and secure it to the end wall 2.

The electric outlet box A is provided with three knock-out discs C on each of the two sides 4 and 5 and these knock-out discs may be of different diameters in order to receive pipes or electric conduits E of the desired size. Also the end wall 3 has a knock-out disc C and inwardly extending tongues 14 associated therewith, see FIGURE 3. The bottom wall 1 has knock-out discs C of different diameters and the circular score lines 13 which constitute the boundaries of these discs have inwardly extending tongues 14 associated therewith. The score lines 13 weaken the metal along circular lines separating the knock-out discs C from the adjacent wall area. The discs C can be readily removed by knocking them out.

It is possible to remove one or more of the knock-out discs C in the bottom wall 1, end walls 2 and 3 and the side walls 4 and 5. The present drawings only show a knock-out disc removed in the end wall 2. The electrician determines where the incoming and outgoing wires are to be placed with reference to the outlet box A and then he removes the desired knock-out discs C to provide the openings for receiving the pipes or conduits that carry the electric wires.

Before the cylindrical portion 19 of the anchor sleeve D can be moved through the opening 20 that is provided by the removal of the knock-out disc C, the electrician must line up the grooves 18a in the portion 19, shown in FIGURE 5, with the tongues 14 that extend inwardly from the periphery of the opening 20. He then moves the anchor sleeve for bringing the nut or head 17 into contact with the inner surface of the outlet box wall 2. The tongues 14 will prevent the rotation of the anchor sleeve D in the opening 20 while the electrician rotates the nut F on the threaded portion 19 for connecting the pipe end 21 to the outlet box.

I will now describe the particular construction of the pair of electric outlet sockets which are mounted in the outlet box A and these are shown in FIGURES 7 to 13 inclusive. FIGURES 8 and 9 show a main insulating rectangular base G that is mounted in the electric outlet box A. FIGURE 7 shows the main insulating base G as having its end 24 inserted under tongues 25 that are struck up from the bottom wall 1 of the box, see FIGURE 8. The main insulating base G rests on the upwardly extending groups of tongues 14 that are integral with the bottom wall 1. FIGURES 8 and 9 show the base G provided with a screw 26 that has a reduced portion received in an opening in the base G and has a threaded portion received in a threaded opening 27 in the bottom wall 1 of the outlet box A, see FIGURE 3. This construction permits a single screw 26 to hold the main insulating base G in the box A. FIGURE 7 shows the side edges of the base G received between upstanding lugs 28 that are struck up from the bottom wall 1 of the box as clearly shown in FIGURE 3.

The main insulating base G is shown in FIGURE 9 as being provided with a pair of cross-shaped legs indicated generally at H and H1. The cross-shaped legs H consist of a flat member 29, see FIGURE 9 and two other flat pieces 30 that are arranged at right angles to the member 29. The edges of the flat pieces 29 and 30 are secured to the main insulating base G. The flat piece 29 has a tubular sleeve 31 at one end and a notch 32 at its other end. One of the two pieces 30 has a tubular sleeve 33 at one end and the other piece 30 has a notch 34 at its other end.

The other cross-shaped leg H1 has a flat piece 35 provided with a tubular sleeve 36 at one end and a notch 37 is placed adjacent to the sleeve. The other portion of the leg H is provided with two pieces 38 that are placed on opposite sides of the piece 35 and extend at right angles thereto. One of the pieces 38 has a tubular sleeve 39 at its outer edge and a notch 40 is placed adjacent to the sleeve.

Figure 12:
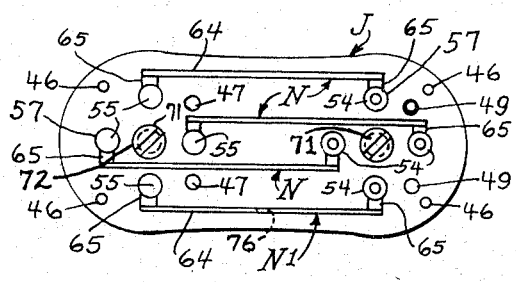
FIGURE 12 is a bottom plan view of the insulating socket base and shows the electric bus bars mounted in grooves in the base. One set of electrical binding posts are shown and one set of metal collars.

FIGURE 9 shows the main insulating base G provided with four nonremovable screws 41 to 44 inclusive. The screw 41 is slidably received in the tubular sleeve 31 while the screws 42 to 44 inclusive are slidably received in the tubular sleeves 33, 43 and 44 respectively. In FIGURES 8 and 12, I show an insulating socket base J and this base has an insulating cover plate J1. A plan view of the insulating cover plate J1 is shown in FIGURE 10. This plate has four openings 45 through which the screws 41 to 44 inclusive extend. FIGURE 12 shows a bottom plan view of the insulating socket base J and this base has four threaded bores 46 that receive the threaded ends of the screws 41 to 44 inclusive. It is possible to tighten the screws in the threaded bores 46 for connecting the insulating socket base J, the insulating cover plate J1 and the main insulating base G together as a unit. The screws 41 to 44 inclusive cannot be removed from their associate tubular sleeves.

I provide novel means for permitting the insulating socket base J and the insulating cover plate J1 to be secured to the pair of cross-shaped legs H and H1 in only one position. In FIGURE 12 the bottom of the insulating socket base J carries two sets of guide pins. The pair of guide pins 47 are associated with the cross-shaped leg H. These guide pins 47 extend through openings 48 in the insulating cover plate J1, see FIGURE 10 when the plate abuts the socket base J and then the guide pins have their outer ends received in the notches 32 and 34 in the leg pieces 29 and 30 respectively of the cross-shaped leg H, see FIGURE 9. In like manner the insulating socket base has two additional guide pins 49, see FIGURE 12, and these extend through openings 50 in the insulating cover plate J1 and are received in the notches 37 and 40 provided in the members 35 and 38 respectively for the cross leg H1 shown in FIGURE 9. The particular arrangement of the pins and the notches prevents the insulating cover plate being turned end for end before being assembled to the socket base and also prevents the insulating cover cap J1 from being turned end for end before being mounted on the pair of cross-shaped legs H and H1.

Figure 11:
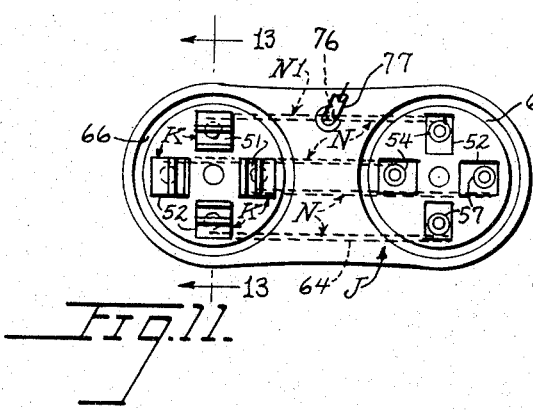
FIGURE 11 is a top plan view of the insulating socket base with both insulating socket caps removed so as to illustrate the four socket terminals for one of the sockets and the four threaded sleeves in the other socket for connection to the four other socket terminals that are not shown in this figure.
Figure 13:
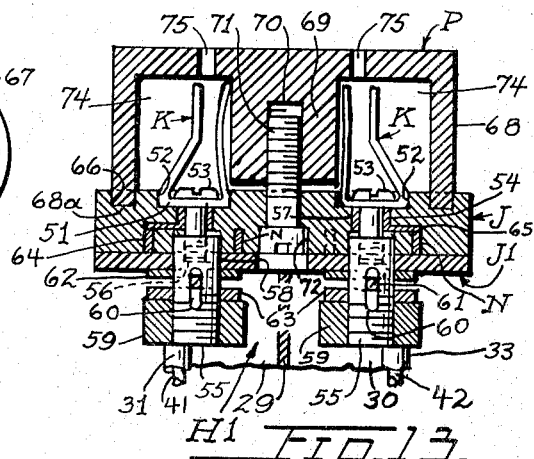
FIGURE 13 is an enlarged transverse section taken along the line 13—13 of FIGURE 11.

Reference to FIGURES 7, 11 and 13 shows the insulating socket base as supporting two groups of electric terminals. One group of four terminals is shown at K in FIGURE 11 and the other group of four terminals is shown at L in FIGURE 7. These socket terminals are of the same shape as shown in my Patent No. 3,195,100 and no lengthy detailed description need be given. In FIGURE 13, I show an enlarged cross-section of FIGURE 11 and two of the terminals K are illustrated. The manner of securing the terminals to the insulating socket base will be the same for all four terminals in each of the two groups K and L and therefore a description for one of the terminals K shown in FIGURE 13 will suffice for all of the others. Two or more terminals K and L may be provided in each group.

The terminal K in FIGURE 13 is preferably being made of copper and is shown as being substantially U-shaped. The socket terminal has a base 51 and this is received in a recess 52 provided in the top of the insulating socket base J. FIGURE 11 shows two sets of recesses 52 of four recesses each in the insulating socket base J. A screw 53, see FIGURE 13, extends through an opening in the base 51 and also extends through a metal collar 54. A metal stud or electric binding post 55 has a threaded central bore 56 extending inwardly from one end for receiving the threaded end of the screw 53. The metal collar 54 is received in a bore 57 provided in the insulating socket base J and this bore is enlarged in diameter for a portion of its length for receiving the metal stud 55. The metal stud or binding post projects through an opening 58 in the insulating plate J1 and the outer end of the stud is threaded for receiving a nut 59. The metal stud or binding post has an elongated slot 60 that extends transversely through the stud and receives an electric wire 61, see FIGURE 13. A metal washer 62 is placed on the stud and bears against the bottom surface of the insulating cover plate J1. A lock washer 63 is also mounted on the metal stud 55 and bears against the opposite side of the electric wire 61. A tightening of the nut 59 will bind the electric wire 61 between the metal washer 62 and the metal lock washer 63 for making a good electrical connection between the wire and binding post. The screw 53 can be tightened for securing the terminal K in electric connection with the stud or binding post 55.

noted that the group of four terminals K are electrically connected in parallel to the group of four terminals L and this is accomplished by four bus bars N. FIGURE 12 shows these bus bars received in grooves 64 provided in the base J. FIGURE 12 illustrates the bus bars as being electrically connected to the metal collars 54 by integral metal lugs 65.

In FIGURES 7, 11 and 13, I show the top of the insulating socket base J provided with two spaced apart circular grooves 66 and 67. An insulating socket cap P has a cylindrical portion whose rim is received in the circular groove 66. A second insulating socket cap Q has its cylindrical portion received in the circular groove 67.

The insulating cap P is shown in an enlarged transverse section in FIGURE 13. This insulating socket cap is substantially the same as the one shown in my Patent No. 3,195,100. The cylindrical portion 68 of the cap P has its circular edge 68a received in the circular groove 66 provided in the insulating socket base J.

The insulating cap P has a central depending portion 69 that has a threaded bore 70 for receiving the threaded shank of a screw 71. FIGURE 13 shows the screw extending through an opening 72 provided in the insulating socket base J. This opening has an enlarged portion for receiving the head of the screw. The insulating cover plate J1 also has an opening 73 that registers with the opening 72 and this permits the screw 71 to be removed from the central portion 69 of the insulating cap P when the operator desires to remove the cap for any purpose such as for the inspection of the electrodes K. The cap has four radially extending partitions 74 that divide the space between the central portion 69 and the cylindrical portion 68 into four compartments, each compartment receiving one of the socket terminals K. The partitions act as insulating barriers between adjacent compartments.

FIGURE 13 further shows the top of the cap as being provided with four slots 75 that register with the four terminals K. These slots are designed to receive the four terminals of the electric plug, not shown, and permit the plug terminals to make an electrical connection with the socket terminals K. As already stated, the electric plugs used with this device are preferably of the type shown in my Patent No. 3,195,100.

The insulating socket caps P and Q are identical to each other and therefore the description of the cap P will suffice for both. The four slots 75 in the insulating cap P are duplicated in the cap Q and these latter slots will register with the socket terminals L shown in FIGURE 7.

The bus bars N connect the four binding posts 55 associated with the terminals K, with the binding posts 55 connected to the four terminals L. One of these bus bars indicated at N1 in FIGURE 11, may constitute an electric ground. An integral projection 76 on the bus bar N1 projects upwardly through an opening in the insulating socket base J and is designed to receive an electric ground wire shown by full lines 77 in FIGURE 11. Such an electric ground wire may extend through an opening 78 in the outlet box cover B, see FIGURE 8. If a person does not wish to have the ground wire 77 extend through the opening 78 in the cover B, he may cause the wire to extend through any one of the openings 20 in the outlet box A after the knock-out disc C for this particular opening has been removed.

In FIGURE 8, I show the electric wires 61 leading to the binding posts 55 of both sets of four each. It is possible to have the electric wires 61 connected to only four of the binding posts 55 of one set, such as the set K, and the bars N will make the other set of four terminals L, electrically active. The wires 61 may extend through one or more of the openings 20 which are provided in the outlet box A as soon as the knock-out discs C are removed.

The wires 61 may extend through openings 79 in the main insulating base G if these wires are to pass through openings in the bottom 1 of the box A, or the wires may pass through a large central opening 80 in the base G.

I claim:
1. In an electric socket:
 (a) an insulating socket base;
 (b) a plurality of electric terminals having base portions;
 (c) screws extending through said base portions of said terminals;
 (d) binding posts carried by said socket base and having threaded bores for receiving said screws;
 (e) electrical conducting collars mounted on said screws;
 (f) bus bars electrically connected to said collars; said insulating socket base having grooves for receiving said bus bars; and
 (g) an insulating plate secured to said socket base and covering said bus bars.
2. In a device of the type described:
 (a) a main base;
 (b) a pair of legs cross-shaped in cross section having notches at predetermined points and being connected to and extending from said main base;
 (c) a socket-carrying base adapted to be supported by said cross-shaped legs and having pins receivable in said notches only when said socket base is in a predetermined position with respect to said cross-shaped legs; and
 (d) means for securing said socket base to said legs.
3. The combination as set forth in claim 2: and in which
 (a) two sets of socket terminals are carried by said socket base;
 (b) bus bars mounted in said socket base and electrically connecting each terminal in one set with a terminal in the other set; and
 (c) an insulating cover plate concealing said bus bars and placed between said socket base and said cross-shaped legs; and said securing means also connecting said cover plate to said socket base and said legs.

4. In a device of the type described:
(a) an insulating socket base;
(b) two sets of socket terminals;
(c) means for securing each terminal to said base and comprising;
(d) a screw connected to said terminal and having a shank;
(e) a metal collar mounted on said screw shank; said shank having a threaded portion extending beyond said collar;
(f) a binding post having a threaded axial bore for receiving the threaded portion of said shank; and having a transverse slot for receiving a wire; and
(g) means for electrically connecting the wire to the binding post;
(h) bus bars mounted in said socket base and electrically connecting each metal collar of one set with a metal collar in the other set;
(i) an insulating cover plate concealing said bus bars.

References Cited

UNITED STATES PATENTS

| | | | |
|---|---|---|---|
| 1,174,027 | 2/1916 | Amon | 339—214 X |
| 2,612,577 | 9/1952 | Jacobi | 339—214 X |
| 2,618,677 | 11/1952 | Parish et al. | 339—192 |

FOREIGN PATENTS

| | | |
|---|---|---|
| 656,380 | 6/1928 | France. |
| 703,709 | 10/1930 | France. |
| 977,303 | 11/1948 | France. |
| 18,551 | A.D. 1891 | Great Britain. |

MARVIN A. CHAMPION, *Primary Examiner.*

RICHARD E. MOORE, *Assistant Examiner.*